United States Patent [19]

Wong

[11] Patent Number: 5,782,191

[45] Date of Patent: Jul. 21, 1998

[54] PUCKER FREE RIGHT FRONT HEM GARMENT SEAM AND METHOD FOR PRODUCTION

[75] Inventor: John Wong, Montreal, Canada

[73] Assignee: Tal Apparel Ltd., Kowloon, Hong Kong

[21] Appl. No.: 782,005

[22] Filed: Jan. 6, 1997

Related U.S. Application Data

[63] Continuation-in-part of Ser. No. 613,656, Mar. 11, 1996, Pat. No. 5,590,615, which is a continuation of Ser. No. 245,122, May 17, 1994, Pat. No. 5,568,779.

[51] Int. Cl.⁶ .............................. D05B 1/18; A41D 27/10; B32B 7/08; B32B 7/12
[52] U.S. Cl. .................. 112/441; 112/475.09; 2/122; 2/275; 156/93
[58] Field of Search ................ 112/441, 475.09, 112/403, 417, 418, 402, 440, 475.01, 420, 429, 416, 475.06; 2/125, 275, 129, 243.1, 272, DIG. 5, 118, 268, 121, 122; 156/91, 92, 93, 275.5; 428/102, 375, 418, 172, 186, 354; 223/2, 4; 28/153

[56] References Cited

U.S. PATENT DOCUMENTS

| | | |
|---|---|---|
| 1,706,461 | 3/1929 | Oathout . |
| 1,784,942 | 12/1930 | Miller . |
| 2,095,886 | 10/1937 | Neuman .............................. 2/275 X |
| 2,120,458 | 6/1938 | Bodle . |
| 2,264,224 | 11/1941 | Swan . |
| 2,266,953 | 12/1941 | Blue . |
| 2,372,632 | 3/1945 | Webb .............................. 2/275 X |
| 2,719,803 | 10/1955 | Nottebohm . |
| 2,731,788 | 1/1956 | Donaldson, Jr. . |
| 2,925,642 | 2/1960 | Pfeffer, Jr. . |
| 2,937,380 | 5/1960 | Reese . |
| 2,988,457 | 6/1961 | Gatcomb . |
| 3,094,705 | 6/1963 | Reid et al. . |
| 3,333,280 | 8/1967 | Hynek et al. .............. 112/475.09 X |
| 3,399,642 | 9/1968 | Etchison et al. . |
| 3,453,662 | 7/1969 | Weiss . |
| 4,077,066 | 3/1978 | Weiss . |
| 4,549,916 | 10/1985 | Off et al. . |
| 4,561,128 | 12/1985 | Zimmerman . |
| 4,803,109 | 2/1989 | Saniscalchi . |
| 5,003,902 | 4/1991 | Benstock et al. . |
| 5,063,101 | 11/1991 | Grynaeus et al. . |
| 5,568,779 | 10/1996 | Wong . |
| 5,590,615 | 1/1997 | Wong . |

FOREIGN PATENT DOCUMENTS

1104802  12/1958  Germany .

Primary Examiner—Ismael Izaguirre
Attorney, Agent, or Firm—Bradford E. Kile; Karan Singh

[57] ABSTRACT

A pucker free garment seam providing a garment with a tailored and wrinkle free appearance. The pucker free seam and method for production utilizes a bonding strip which contains at least a thermal adhesive component which is inserted between first and second surfaces of a garment component along the seam. A sufficient amount of heat and pressure is applied to the seam which causes the adhesive of the bonding strip to flow onto the surfaces of the garment components thereby creating a compressed seam and permanently bonding the first and second surfaces of the garment component together along the seam to eliminate puckering associated with shrinkage of the sewing thread.

58 Claims, 2 Drawing Sheets

PUCKER FREE RIGHT FRONT HEM GARMENT SEAM AND METHOD FOR PRODUCTION

RELATED INVENTION

This application is a continuation-in-part of applicant's prior application Ser. No. 08/613,656 filed Mar. 11, 1996, entitled "Pucker Free Garment Seam and Method of Manufacture" now U.S. Pat. No. 5,590,615 which is a continuation of applicant's prior application Ser. No. 08/245,122, filed May 17, 1994, entitled "Pucker Free Garment Seam and Method of Manufacture" now U.S. Pat. No. 5,568,779, all of common assignment herewith.

BACKGROUND OF THE INVENTION

The present invention relates to a pucker free garment seam and method for production. More specifically, the invention is directed to an improved garment seam and method for production which facilely eliminates a tendency of the seam to bunch or pucker at a right front hem seam attachment area and other similar areas following conventional laundering procedures.

A puckering phenomenon at seam lines has long plagued the garment industry. Seam pucker is typically caused by thread shrinkage which occurs during the laundering of a garment. In particular, after a garment is purchased by a garment consumer it is subjected to laundering cycles as the shirt is worn and becomes soiled. During these laundering and drying cycles the sewing thread typically undergoes longitudinal shrinkage. It is this shrinkage, at a rate greater than the surrounding shirt material, that creates puckering at a seam joining two panels of fabric. In this, the sewing thread contracts upon being laundered and pulls on opposing garment components at the garment seam which in turn causes the garment components to buckle and thereby create wrinkles along the garment seam. This effect is noticeable in the right front hem seam of dress shirts. Accordingly, it would be highly desirable to provide a method for production and a garment which would be free of this pucker phenomenon and which would maintain a seam which would be smooth and pucker free even after multiple laundering operations.

Several attempts have been made to reduce seam pucker in a dress shirt. One such attempt utilizes an interlining having a thermoplastic component in the interlining matrix. During the manufacture process the seam is ironed which reduces the cross-sectional thickness of the seam along the stitch line. The reduced thickness allows for slack in the sewing thread such that during subsequent laundering the sewing thread is permitted to shrink an amount equal to the slack. This technique is not entirely effective in reducing seam pucker. First, the garment components sewn together at the seam are allowed to pull apart between outer stitches of the seam which results in buckling of the garment fabric. Second, the thread which is compressed in the interlining matrix becomes bound within the matrix thus shrinkage of the thread still results in at least a degree of seam pucker. Third, producing an interlining results in an overall increase in garment manufacturing cost. This cost is compounded if the interlining is a composite interlining.

Another prior attempt at reducing seam pucker utilizes special garment material. Specifically, the garment components sewn together at the seam are manufactured from material which stretches during the is sewing process and which relaxes after the sewing process is complete. This relaxation provides for slack in the sewing thread. This attempt is also ineffective at reducing seam pucker. First, as before, the garment components sewn together at the seam are allowed to pull apart between outer stitches of the seam which results in buckling of the garment fabric. Second, only garments manufactured from certain stretch materials may be utilized to manufacture the garments. The disadvantages associated with this are clear.

Still other prior art attempts alter the nature of the sewing thread used in the sewing process. For example, one such attempt utilizes a composite sewing thread whereby one component of the thread is water soluble. During the laundering process the water soluble component dissolves thereby creating slack in the sewing thread which compensates for thread shrinkage. First, as before, the garment components sewn together at the seam are allowed to pull apart between outer stitches of the seam which results in buckling of the garment fabric. Second, the high cost of producing a sewing thread altered in this way increases the overall garment cost. Third, thread strength can be compromised by a composite design. Last, commercial sewing machines are not well adapted to utilize altered thread. Other prior art attempts which alter the nature of the sewing thread are not believed to be fully effective for the same noted reasons.

The difficulties and limitations suggested in the preceding are not intended to be exhaustive, but rather are among many which demonstrate that although significant attention has been devoted to reducing pucker in garment seams, puckerless garment seams and method for production appearing in the past will admit to worthwhile improvement.

OBJECTS AND BRIEF SUMMARY OF THE INVENTION

It is therefore a general object of the invention to provide a novel, smooth garment seam and method for production which will obviate or minimize difficulties of the type previously described.

It is a specific object of the invention to provide a smooth garment seam and method for production which will eliminate seam pucker at a right front hem of a shirt.

It is another object of the invention to provide a smooth garment seam and method for production which may be used in a variety of garments to provide a pucker free tailored appearance.

It is still another object of the invention to provide a smooth garment seam and method for production for advantageous use in a right front hem seam of a dress shirt.

It is yet another object of the invention to provide a smooth right front hem garment seam and method for production which provides for a cost effective solution to seam pucker and does not involve significant modification of existing production apparatus.

SUMMARY OF A PREFERRED EMBODIMENT OF THE INVENTION

A preferred embodiment of the invention which is intended to accomplish the foregoing objects includes a bonding strip which contains at least a thermal adhesive component which is inserted between layers of a garment component along a seam line of a garment. The seam is subjected to a sufficient amount of heat and pressure to cause the adhesive of the bonding strip to flow over the surfaces of the garment component thereby creating a compressed seam and permanently bonding the garment component along the seam to eliminate puckering associated with sewing thread shrinkage.

DRAWINGS

Other objects and advantages of the present invention will become apparent from the following detailed description of a preferred embodiment thereof taken in conjunction with the accompanying drawings, wherein.

DETAILED DESCRIPTION

Figure 1:
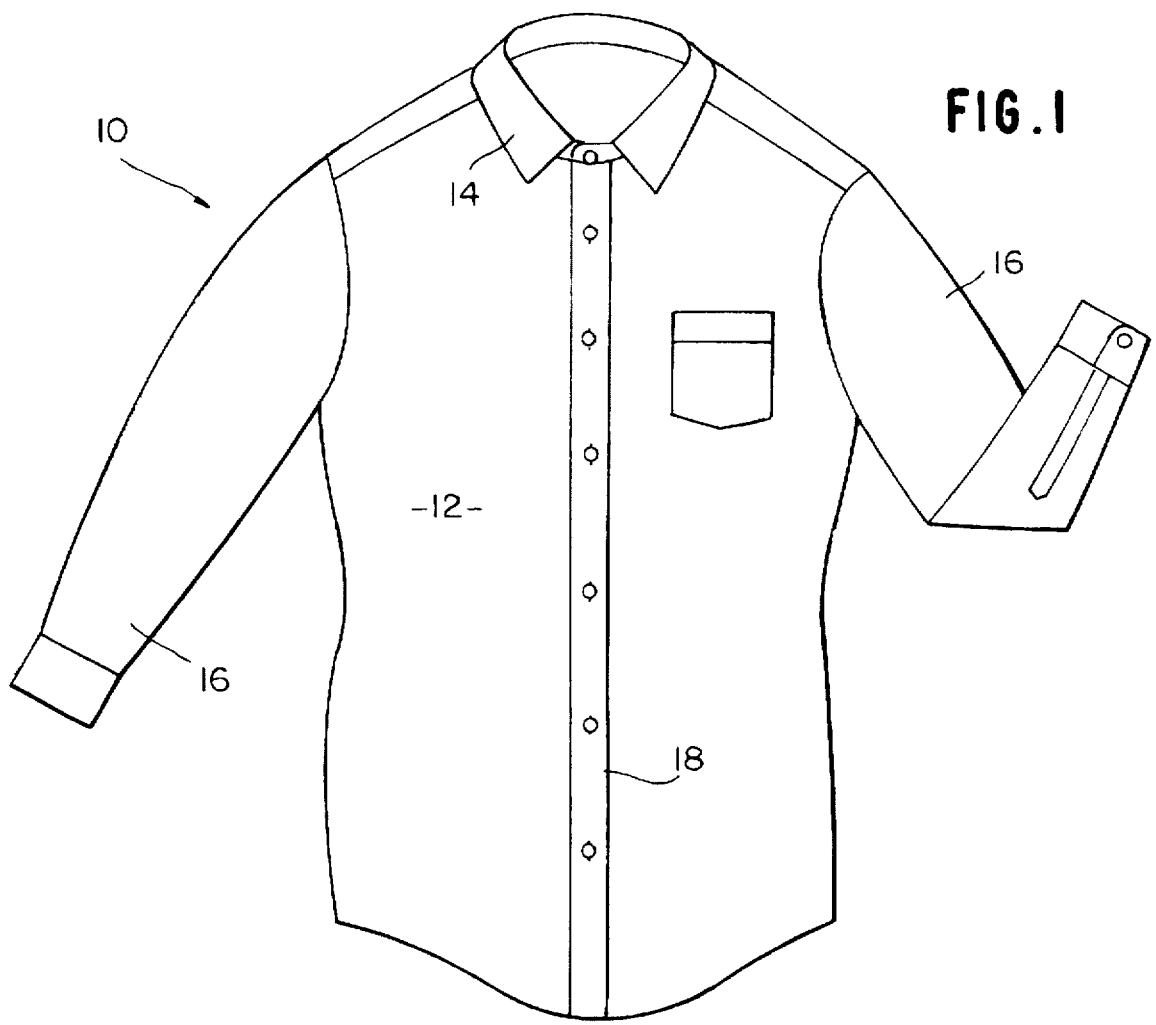
FIG. 1 is a front view showing a shirt having at least a right front hem seam produced in accordance with the present invention.
Figure 2:
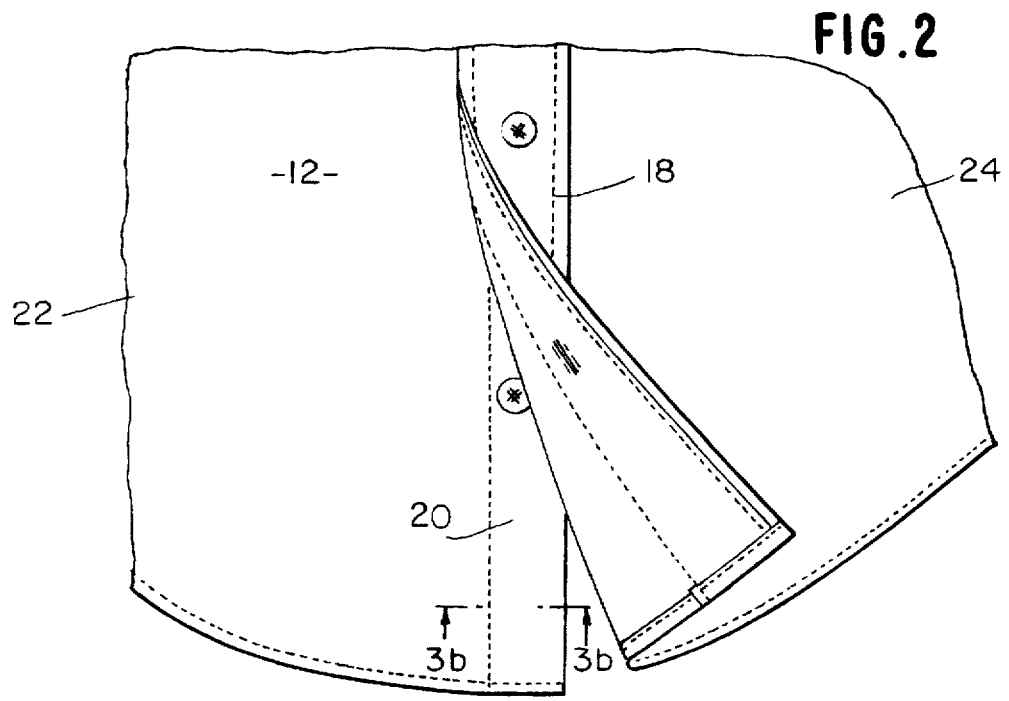
FIG. 2 is a segmental detail view showing a portion of the front hem seam of the dress shirt depicted in FIG. 1 in which the front hem seam has been produced in accordance with the present invention.

Referring now to the drawings and particularly to FIG. 1, there is shown a dress shirt 10. The shirt 10 includes a front shirt panel 12, a collar 14, sleeves 16 and a center placket 18 which covers a right front hem seam 20 produced in accordance with the present invention. FIG. 2 depicts a segment of the dress shirt right front hem seam 20, a right front panel 22, and left front panel 24 of the shirt. The phenomenon of seam pucker is troubling in a right front hem seam 20 because of its location which impacts the highly visible center placket 18. Moreover the front hem 20 can be visible at the neck of the shirt if a wearer removes his tie and opens the top shirt button.

Figure 3A:
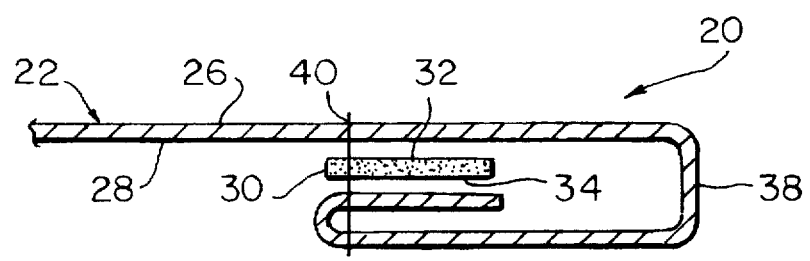
FIGS. 3a and 3b show a cross-sectional view of a method for producing a dress shirt right front hem seam in accordance with the present invention.
Figure 3B:
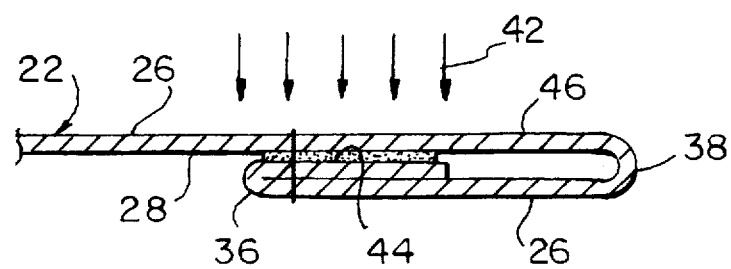

FIGS. 3a and 3b show the production steps for producing the hem seam 20 of the present invention. FIG. 3b shows a cross-sectional view of a completed right front hem seam 20 produced in accordance with the present invention.

Referring to FIG. 3a there is shown a garment component 22. In the right front hem embodiment of the present invention, the garment component 22 comprises a right front panel of the shirt. The garment component 22 has a first surface 26 and a second surface 28.

A bonding strip 30 forms an integral part of the present invention. The bonding strip 30 has a first surface 32 and a second surface 34. In the preferred embodiment of the invention, and as shown in the Figures, the bonding strip 30 is an adhesive web consisting entirely of an adhesive material. The adhesive material is preferably composed of a polyamide, polyester, or an olefinic material such as a low density polyethylene. Other thermoplastic materials such as polyurethane and ethylene vinylacetate copolymer can also be used. The aforementioned adhesives are preferable because they all have a low melting point in the range of 60–160 degree celsius. In the preferred embodiment, the adhesive web is produced from a plurality of filaments having a diameter ranging between 20–80 microns. Furthermore, the adhesive web of the present invention has a density of approximately 10–100 grams per square meter. Alternatively, a more solid structured net adhesive may be used having a density preferably in a range of 8–80 grams per square meter. Of course, other types of adhesives are contemplated in the present invention.

The garment component 22 is reverse folded at its edge 36 and the first surface 26 extends along the second surface of the bonding strip 30. The garment component 22 is reversed folded a second time at 38 such that the second surface 28 of the twice folded garment component 22 abuts the first surface 32 of the bonding strip 30.

A stitch 40 is sewn along the seam line defined by the garment component 22, the bonding strip 30, the twice reverse folded layer of the garment component 22 which abuts the second surface 34 of the bonding strip 30, and the reverse folded layer of the garment component 22. As shown in FIG. 3a, this stitch 40 traverses the garment component 22, the bonding strip 30, and the twice reverse folded layer of the garment component 22. In the embodiments of FIGS. 3a through 3b this stitch is a single needle stitch. In certain instances a double stitch can be used to enhance the strength of the seam.

Production of the improved seam 20 of the present invention is completed with the application of heat and pressure to the seam. This can be accomplished with an ironing process. For improved control and quality this process is usually carried out on a heated press, as schematically depicted by arrows 42, with a temperature of up to 160 degrees celsius for 5 to 10 seconds followed with a vacuum step to cool and set the adhesive. The applied heat and pressure 42 cause the adhesive of the bonding strip 30 to melt and flow onto the surfaces 26 and 28 of the garment component 22. That is, the adhesive flows onto a portion 44 of the twice reverse folded first or upper surface 26 of the garment component 22 along a second or lower surface 34 of the bonding strip 30 and concomitantly onto a second or lower 28 portion of the unfolded garment component 22. Significantly, during the ironing/pressing process 42, the flowing adhesive becomes interposed in the interstices of the garment fabric of the component 22. This is advantageous because it creates a strong bond between the surfaces 26 and 28 of the garment component 22 along the seam 20. It is this bond that prevents seam pucker during subsequent laundering operations. In particular, because the garment component 22 is bonded along the seam, it cannot pull apart during laundering and, therefore, buckling of the seam fabric will be prevented. This is a significant advantage over the prior art seams which permit the fabric layers to become separated during subsequent laundering operations which, in turn, results in seam pucker. The ironing/pressing 42 process also compresses the seam 20 to reduce the seam thickness.

The unfolded portion 46 of the garment component 22 is where the buttons of the dress shirt 10 are attached. If this seam 20 puckers, the buttons, in turn, will be pulled closer together or exhibit an irregular spacing. As this happens, parts of the center placket 18, the most visible portion of a dress shirt 10, may begin to bulge outward. As such, for maximum prevention of pucker it is important to have the adhesive of the bonding strip 30 flow over the entire surface of the seam width. This will ensure complete bonding of the garment layer 22 which abuts the top surface 32 of the bonding strip 30 and the twice reverse folded surface 26 of the garment component 22 which abuts the lower surface 34 of the bonding strip 30.

Although in the preferred embodiment the bonding strip 30 consist of an adhesive web as described above, other elements are contemplated. In an alternative embodiment the bonding strip 30 consist of an interlining having an adhesive coating on its outer surfaces. Interlinings are known in the art to provide stiffness to garment components. For example, interlinings are used in shirt collars and center plackets to provide a degree of stiffness. However, the interlining of the present invention utilizes an adhesive on its outer surfaces and is specifically used for garment seams. More specifically, the interlining body of the present invention is preferably a woven interlining made from cotton or a polyester/cotton blend. Alternatively, a nonwoven interlining body made from polyester, nylon, viscose or blends of these materials may be used. Preferably, the interlining body is fabricated from a single material so as to avoid the high cost associated with producing composite interlinings. The interlinings have a coating of an adhesive on an upper and lower surface. The adhesive is preferably one of the same thermal adhesives previously mentioned in the adhesive web embodiment discussed above. The adhesive may be applied on the upper and lower surfaces of the interlining as an adhesive layer or as a series of adhesive dots. Significantly, a quantity of adhesive sufficient to flow over the garment surfaces as described above is needed in order to provide complete bonding as contemplated by the present invention.

The pucker free right front hem garment seam 20 depicted in the figures is an exemplary seam and is not intended to limit the scope of the invention.

Although the specific embodiment as shown in the Figures is directed to a right front hem seam 20 of a dress shirt 10, it is to be understood that the seam 20 and method for production of the present invention can advantageously be utilized in a variety of garments, for example, in various seams of dress slacks.

SUMMARY OF MAJOR ADVANTAGES OF THE INVENTION

After reading and understanding the foregoing detailed description of an inventive right front hem garment seam and method for production in accordance with preferred embodiments of the invention, it will be appreciated that several distinct advantages of the subject garment seam and method for production are obtained.

Without attempting to set forth all of the desirable features of the instant garment seam and method for production, at least some of the major advantages include providing a pucker free garment seam consisting of a garment component, such as a component of a dress shirt right front panel and a bonding strip.

The use of the bonding strip provides a pucker free garment seam which has not been successfully accomplished by prior art attempts. Preferably, the bonding strip comprises an adhesive web which flows during ironing onto the abutting surfaces of the garment component to create a strong bond along the garment seam. This bond prevents the garment component from separating during subsequent laundering of the garment. Alternatively, bonding strip consist of an interlining body having a thermal adhesive coating on its outer surface. The interlining body can be fabricated from a single material thus avoiding the use of costly composite interlining body.

The right front hem garment seam and method for production of the present invention provides for a less costly alternative to other prior art attempts at eliminating seam pucker and without the need for substantial modification of current seam production operations.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:

1. A method for producing a smooth seam in a garment component, said method comprising the steps of:
   (a) reverse folding an edge of the garment component;
   (b) placing a bonding strip having a first and second surface and at least a thermal adhesive component co-extensive with the reverse portion of the garment component, such that the second surface of the bonding strip abuts a first surface of the garment component;
   (c) reverse folding the garment component a second time such that a portion of a second surface of the twice folded garment component abuts the first surface of the bonding strip and a portion of the second surface of the twice folded garment component abuts itself;
   (d) sewing the garment component and the bonding strip together by a stitch running along the bonding strip; and
   (e) applying sufficient heat and pressure to said bonding strip to cause the thermal adhesive to melt such that said adhesive flows onto a portion of the folded first surface of the garment component along a second surface of the bonding strip and concomitantly onto a portion of the second surface of the twice folded garment component along the first surface of the bonding strip to provide a bond along the seam and around the stitch such that the bonded component will effectively reduce a tendency of the seam to exhibit pucker following laundering operations.

2. A method for producing a smooth seam in a garment component, as defined in claim 1 wherein:
   said step of placing a bonding strip comprises placing an adhesive composed of a thermoplastic material.

3. A method for producing a smooth seam in a garment component, as defined in claim 2 wherein:
   said step of placing a bonding strip comprises placing an adhesive composed of a thermoplastic material selected from the group consisting of polyamide, polyester, olefinic, polyurethane, and ethylene vinylacetate copolymer materials.

4. A method for producing a smooth seam in a garment component, as defined in claim 1 wherein:
   said step of placing a bonding strip comprises placing a thermal adhesive having a melting point ranging from approximately 60 to 160 degrees celsius.

5. A method for producing a smooth seam in a garment component, as defined in claim 1 wherein:
   said step of placing a bonding strip comprises placing a thermal adhesive net having a density of approximately 8 to 80 grams per square meter.

6. A method for producing a smooth seam in a garment component, as defined in claim 1 wherein:
   said step of placing a bonding strip garment component comprises placing a bonding strip and a comprising the right front panel of a dress shirt such that said seam is the right-front hem seam of a dress shirt.

7. A method for producing a smooth seam in a garment component, as defined in claim 1 wherein:
   said step of placing a bonding strip comprises placing said bonding strip and garment component such that said seam is the right-front hem seam of a dress shirt.

8. A method for producing a smooth seam in a garment component, as defined in claim 1 wherein:
   the step of applying of heat and pressure comprises ironing and pressing.

9. A method for producing a smooth seam in a garment component, as defined in claim 8 wherein:
   the step of applying an ironing and pressing process comprises carrying out the process at a temperature from 60 to 160 degrees celsius for 5 to 10 seconds.

10. A method for producing a smooth seam in a garment component, as defined in claim 1 wherein:
    said step of placing a bonding strip comprises placing between the reverse folded first surface of the garment component and an unfolded second surface of the garment component a thermal adhesive web or net composed entirely of a thermal adhesive.

11. A method for producing a smooth seam in a garment component, as defined in claim 10 wherein:

said step of placing a bonding strip comprises placing a thermal adhesive web composed of a plurality of adhesive filaments having a diameter ranging approximately between 20 to 80 microns.

12. A method for producing a smooth seam in a garment component, as defined in claim 10 wherein:

said step of placing a bonding strip comprises placing a thermal adhesive web having a density of approximately 10 to 100 grams per square meter.

13. A method for producing a smooth seam in a garment component, as defined in claim 1 wherein:

said step of placing a bonding strip comprises placing an interlining having a quantity of thermal adhesive on upper and lower surfaces.

14. A method for producing a smooth seam in a garment component, as defined in claim 13 wherein:

said step of placing a bonding strip comprises placing a woven interlining fabricated from cotton.

15. A method for producing a smooth seam in a garment component, as defined in claim 13 wherein:

said step of placing a bonding strip comprises placing a woven interlining fabricated from polyester/cotton blend.

16. A method for producing a smooth seam in a garment component, as defined in claim 13 wherein:

said step of placing a bonding strip comprises placing a nonwoven interlining fabricated from a material selected from the group consisting of polyester, nylon, and viscose and blends thereof.

17. A method for producing a smooth seam in a garment component, as defined in claim 1 wherein:

said step of applying heat and pressure comprises applying said heat and pressure for at least 5 seconds.

18. A method for producing a smooth seam in a garment component, as defined in claim 1 wherein:

said step of sewing comprises sewing through an unfolded portion of the garment component which abuts the bonding strip, the bonding strip, the twice reverse folded portion of the garment component and the reverse folded portion of the garment component.

19. A method for producing a smooth seam in a garment component, as defined in claim 1 wherein:

said step of placing a bonding strip comprises placing a generally rectangular strip positioned between the reverse folded first surface and the second surface of the garment component without forming a fold in the generally rectangular strip.

20. In a shirt having a smooth right-front hem seam comprising:

a bonding strip having at least a thermal adhesive component and having a first and second surface;

a garment component having a first and second surface, the garment component being reverse folded at an edge location and the bonding strip being positioned coextensive with the reverse fold;

the garment component being reverse folded a second time with the portion of the second surface of the twice folded garment component being bonded to said first surface of the bonding strip;

a stitch extending along the seam sewing the garment component and the bonding strip together and wherein bonding the seam comprises subjecting the seam to a sufficient amount of heat and pressure to cause the thermal adhesive to bond a portion of the second surface of an unfolded portion of the garment component along a first surface of said bonding strip and concomitantly bond a first surface of twice folded garment component along second surface of said bonding strip such that a bond is formed by the bonding strip along the seam to reduce a tendency to pucker following laundering operations.

21. In a shirt having a smooth seam as defined in claim 20 wherein:

said adhesive is composed of a thermoplastic material.

22. In a shirt having a smooth seam as defined in claim 21 wherein:

said adhesive is composed of a thermoplastic material selected from the group consisting of polyamide, polyester, olefinic, polyurethane, and ethylene vinylacetate copolymer materials.

23. In a shirt having a smooth seam as defined in claim 20 wherein:

said thermal adhesive has a melting point ranging from approximately 60 to 160 degrees celsius.

24. In a shirt having a smooth seam as defined in claim 20 wherein:

said bonding strip is a thermal adhesive net having a density of approximately 8 to 80 grams per square meter.

25. In a shirt having a smooth seam as defined in claim 20 wherein:

said garment component comprises right-front panel of a dress shirt.

26. In a shirt having a smooth seam as defined in claim 20 wherein:

said seam is the seam of a dress shirt a right-front hem seam.

27. In a shirt having a smooth seam as defined in claim 20 wherein:

said heat and pressure are accomplished by an ironing and pressing process.

28. In a shirt having a smooth seam as defined in claim 27 wherein:

the ironing and pressing process is carried out at a temperature between 60 and 160 degrees celsius for 5 to 10 seconds.

29. In a shirt having a smooth seam as defined in claim 20 wherein:

said bonding strip is a thermal adhesive web composed entirely of a thermal adhesive.

30. In a shirt having a smooth seam as defined in claim 29 wherein:

said thermal adhesive web is composed of a plurality of adhesive filaments having a diameter ranging approximately between 20 to 80 microns.

31. In a shirt having a smooth seam as defined in claim 29 wherein:

said thermal adhesive web has a density of approximately 10 to 100 grams per square meter.

32. In a shirt having a smooth seam as defined in claim 20 wherein:

said bonding strip comprises an interlining having on upper and lower surfaces a quantity of thermal adhesive.

33. In a shirt having a smooth seam as defined in claim 32 wherein:

said interlining is a woven interlining fabricated from cotton.

34. In a shirt having a smooth seam as defined in claim 32 wherein:

said interlining is a woven interlining fabricated from polyester/cotton blend.

35. In a shirt having a smooth seam as defined in claim 32 wherein;

said interlining is a nonwoven interlining fabricated from a material selected from the group consisting of polyester, nylon, and viscose and blends thereof.

36. In a shirt having a smooth seam as defined in claim 20 wherein:

said heat and pressure are applied for at least 5 seconds.

37. In a shirt having a smooth seam as defined in claim 20 wherein:

said bonding strip is a generally rectangular strip positioned between the reverse folded first surface and the unfolded second surface of the garment component without forming a fold in the rectangular strip.

38. In a shirt having a smooth seam as defined in claim 20 wherein:

said stitch traverses through the unfolded portion of the garment component which abuts the bonding strip, the bonding strip and the twice reverse folded portion of the garment component.

39. A method for producing a pucker free garment seam along the right front panel of a shirt, said method comprising the steps:

(a) providing a garment component forming a right-front panel of a shirt and having a first and a second surface;

(b) reverse folding an edge of the garment component;

(c) providing a bonding strip having a first and a second surface and at least a thermal adhesive component and placing the bonding strip adjacent the garment component such that second surface of the bonding strip abuts the reverse folded surface of the garment component and as to define a seam;

(d) reverse folding the garment component a second time such that a portion of the second surface of the twice folded garment component abuts an first surface of the bonding strip and a portion of the second surface of the twice folded garment component abuts itself;

(e) sewing a stitch along the seam such that it traverses through at least the unfolded portion of the garment component, the bonding strip, and the reverse folded portion of the garment component; and (h) applying sufficient heat and pressure to the bonding strip to cause the thermal adhesive to melt such that the adhesive flows onto a portion of the twice folded first surface and along a second surface of the bonding strip and concomitantly onto a portion of the second surface of the unfolded garment component along a first surface of the bonding strip to provide a bond along the seam such that the bonding will effectively reduce a tendency of the seam to exhibit pucker following laundering operations.

40. A method for producing a pucker free garment seam along the right front panel of a shirt as defined in claim 39 wherein:

said step of placing a bonding strip comprises placing an adhesive composed of a thermoplastic material.

41. A method for producing a pucker free garment seam along the right front panel of a shirt as defined in claim 39 wherein:

said step of placing a bonding strip comprises placing a thermal adhesive having a melting point ranging from approximately 60 to 160 degrees celsius.

42. A method for producing a pucker free garment seam along the right front panel of a shirt as defined in claim 39 wherein:

said step of placing a bonding strip comprises lacing a thermal adhesive net having a density of approximately 8 to 80 grams per square meter.

43. A method for producing a pucker free garment seam along the right front panel of a shirt as defined in claim 39 wherein:

the step of applying heat and pressure comprise the step of ironing and pressing at a temperature up to 160 degrees celsius for 5 to 10 seconds.

44. A method for producing a pucker free garment seam along the right front panel of a shirt as defined in claim 39 wherein:

said step of placing a bonding strip comprises placing between the reverse folded first surface and the second surface of the garment component a thermal adhesive web or net composed entirely of a thermal adhesive.

45. A method for producing a pucker free garment seam along the right front panel of a shirt as defined in claim 44 wherein:

said step of placing a bonding strip comprises placing a thermal adhesive web composed of a plurality of adhesive filaments having a diameter ranging approximately between 20 to 80 microns.

46. A method for producing a pucker free garment seam along the right front panel of a shirt as defined in claim 39 wherein:

said step of placing a bonding strip comprises placing an interlining having a quantity of thermal adhesive on upper and lower surfaces.

47. A method for producing a pucker free garment seam along the right front panel of a shirt as defined in claim 39 wherein:

said step of sewing comprises sewing through the unfolded portion of the garment component which abuts the bonding strip, the bonding strip, and the twice reverse folded garment component.

48. A method for producing a pucker free garment seam along the right front panel of a shirt as defined in claim 39 wherein:

said step of placing a bonding strip comprises placing a generally rectangular strip positioned between the reverse folded first surface and the second surface of the garment component without forming a fold in the generally rectangular strip.

49. In a shirt having a right-front panel component, viewed from the perspective of a wearer of the shirt, forming a pucker free right-front hem seam, said pucker free seam comprising:

a bonding strip having at least a thermal adhesive component and having a first and second surface;

a garment component forming the right-front panel of the shirt having a first and a second surface, the garment component being reverse folded at an edge location and the bonding strip being positioned coextensive with the reverse fold;

the garment component being reverse folded a second time with a portion of the second surface of the twice folded garment component being bonded to said first surface of the bonding strip;

a stitch extending along the seam and traversing through at least the garment component, the bonding strip, and the reverse folded garment component and wherein bonding the seam comprises subjecting the seam to a sufficient amount of heat and pressure to cause the bonding strip to bond at its second surface to a portion of the twice folded first surface of the garment component and concomitantly at the first surface of the bonding strip to the second surface of an unfolded portion of the garment component such that the bonded component will effectively reduce a tendency of the seam to exhibit pucker following laundering operations.

50. In a shirt having a right-front panel component, viewed from the perspective of a wearer of the shirt, forming a pucker free right-front hem seam, said pucker free seam as defined in claim 49 wherein:

said adhesive is composed of a thermoplastic material.

51. In a shirt having a right-front panel component, viewed from the perspective of a wearer of the shirt, forming a pucker free right-front hem seam, said pucker free seam as defined in claim 49 wherein:

said thermal adhesive has a melting point ranging from approximately 60 to 160 degrees celsius.

52. In a shirt having a right-front panel component, viewed from the perspective of a wearer of the shirt, forming a pucker free right-front hem seam, said pucker free seam as defined in claim 49 wherein:

said bonding strip is a thermal adhesive net having a density of approximately 8 to 80 grams per square meter.

53. In a shirt having a right-front panel component, viewed from the perspective of a wearer of the shirt, forming a pucker free right-front hem seam, said pucker free seam as defined in claim 49 wherein:

the heat and pressure process is carried out by ironing and pressing at a temperature up to 160 degrees celsius for 5 to 10 seconds.

54. In a shirt having a right-front panel component, viewed from the perspective of a wearer of the shirt, forming a pucker free right-front hem seam, said pucker free seam as defined in claim 49 wherein:

said bonding strip is a thermal adhesive web composed entirely of a thermal adhesive.

55. In a shirt having a right-front panel component, viewed from the perspective of a wearer of the shirt, forming a pucker free right-front hem seam, said pucker free seam as defined in claim 54 wherein:

said thermal adhesive web is composed of a plurality of adhesive filaments having a diameter ranging approximately between 20 to 80 microns.

56. In a shirt having a right-front panel component, viewed from the perspective of a wearer of the shirt, forming a pucker free right-front hem seam, said pucker free seam as defined in claim 49 wherein:

said bonding strip comprises an interlining having on a first and second surface a quantity of thermal adhesive.

57. In a shirt having a right-front panel component, viewed from the perspective of a wearer of the shirt, forming a pucker free right-front hem seam, said pucker free seam as defined in claim 49 wherein:

said stitch traverses through the unfolded portion of the garment component which abuts the bonding strip, the bonding strip, the twice reverse folded portion of the garment component, and the reverse folded portion of the garment component.

58. In a shirt having a right-front panel component, viewed from the perspective of a wearer of the shirt, forming a pucker free right-front hem seam, said pucker free seam as defined in claim 49 wherein:

said bonding strip in a generally rectangular strip positioned between the reverse folded first surface and the second surface of the garment component without forming a fold in the rectangular strip.

* * * * *

Disclaimer

5,782,191 — John Wong, Montreal, Canada. PUCKER FREE RIGHT FRONT HEM GARMENT SEAM AND METHOD FOR PRODUCTION. Patent dated Jul. 21, 1998. Disclaimer filed Feb. 21, 2006 by the Assignee, Taltech, Limited.

The term of this patent, subsequent to 5,568,779, 5,590,615, 5,713,292, 5,775,394, 5,950,554, 6,070,542 and 6,079,343 has been disclaimed.

(*Official Gazette May 23, 2006*)